(12) United States Patent
Umehara et al.

(10) Patent No.: US 7,318,467 B2
(45) Date of Patent: Jan. 15, 2008

(54) CALIPER BODY AND METHOD OF MANUFACTURING CALIPER BODY OF VEHICULAR DISK BRAKE

(75) Inventors: Yoshiaki Umehara, Nagano (JP); Syoji Kaiume, Nagano (JP); Takenori Tsuchiya, Nagano (JP)

(73) Assignee: Nissin Kogyo Co., Ltd., Nagano-ken (JP)

( * ) Notice: Subject to any disclaimer, the term of this patent is extended or adjusted under 35 U.S.C. 154(b) by 0 days.

(21) Appl. No.: 11/748,827

(22) Filed: May 15, 2007

(65) Prior Publication Data

US 2007/0209773 A1    Sep. 13, 2007

Related U.S. Application Data

(62) Division of application No. 09/695,874, filed on Oct. 26, 2000, now Pat. No. 7,232,015.

(30) Foreign Application Priority Data

Oct. 29, 1999  (JP)  ............................... 11-309718

(51) Int. Cl.
*B22D 37/00*  (2006.01)
(52) U.S. Cl. ...................... 164/133; 164/335
(58) Field of Classification Search ........ 164/133–136, 164/335–337
See application file for complete search history.

(56) References Cited

U.S. PATENT DOCUMENTS 4,194,597 A  3/1980  Evans et al.
4,483,809 A  11/1984  Ando et al.

(Continued)

FOREIGN PATENT DOCUMENTS

DE  19647999  5/1998

(Continued)

OTHER PUBLICATIONS

Japanese Office Action issued in JP 11-309718, mailed Oct. 31, 2006.

(Continued)

*Primary Examiner*—Kuang Lin
(74) *Attorney, Agent, or Firm*—Greenblum & Bernstein, P.L.C.

(57) ABSTRACT

A method of manufacturing the caliper body of a vehicular disc brake by the gravity casting method. The caliper body is used for the vehicular disc brake wherein a pair of frictional pads are disposed opposite to each other with a disc rotor held therebetween. The caliper body has a cylinder disposed on one side of the disc rotor, a reaction pawl disposed on the other side of disc rotor, and a bridge for coupling the cylinder and the reaction pawl on the outer peripheral side of the disc rotor. A sprue is provided in the bottom portion of the cylinder, and the caliper body is cast by a cavity with the side of molding the bottom portion of the cylinder disposed in the upper part of and in the vertical direction of the cavity and with the side of molding the reaction pawl disposed in the lower part of and in the vertical direction thereof. Accordingly, it is possible to make a product stable in quality by the gravity casting method, the product having sufficient rigidity as the caliper body of a vehicular disc brake.

13 Claims, 8 Drawing Sheets

U.S. PATENT DOCUMENTS

| | | |
|---|---|---|
| 4,506,722 A | 3/1985 | Yamaguchi et al. |
| 4,705,093 A | 11/1987 | Ogino |
| 4,804,035 A | 2/1989 | Murai et al. |
| 5,249,649 A | 10/1993 | Emmons |
| 5,263,531 A | 11/1993 | Drury et al. |
| 5,424,112 A | 6/1995 | Kataoka et al. |
| 5,518,062 A | 5/1996 | Kobayashi et al. |
| 5,558,183 A | 9/1996 | Way |
| 5,620,044 A | 4/1997 | Grenkowitz et al. |
| 5,704,413 A | 1/1998 | Takasaki et al. |
| 5,846,348 A | 12/1998 | Sakoda et al. |
| 5,887,684 A | 3/1999 | Doll et al. |
| 6,298,954 B1 | 10/2001 | Weiler et al. |

FOREIGN PATENT DOCUMENTS

| | | | |
|---|---|---|---|
| JP | 5617160 | 2/1981 | |
| JP | 62270835 | 11/1987 | |
| JP | 1146718 | 6/1989 | |
| JP | 07083252 | 3/1995 | |
| JP | 07208514 | 8/1995 | |
| JP | 835530 | 2/1996 | |
| JP | 08210394 | 8/1996 | |
| JP | 10009297 | 1/1998 | |
| JP | 10184746 | 7/1998 | |
| JP | 161398 | 6/2000 | |
| JP | 2002-333040 | * 11/2002 | |
| WO | 9827353 | 6/1998 | |

OTHER PUBLICATIONS

English language translation of Japanese Office Action issued in JP-309718, mailed Oct. 31, 2006.
English language translation of JP-08035530.
English language translation of WO-9827353.
English language translation of JP-1146718.
European Search Report dated Aug. 29, 2003.

* cited by examiner

CALIPER BODY AND METHOD OF MANUFACTURING CALIPER BODY OF VEHICULAR DISK BRAKE

CROSS REFERENCE TO RELATED APPLICATIONS

This application is a divisional application of U.S. application Ser. No. 09/695,874 filed on Oct. 26, 2000, and now U.S. Pat. No. 7,232,015 the contents of which are incorporated by reference in their entirety. This application also claims priority under 35 U.S.C. §119 of Japanese Application No. HEI 11-309718, filed on Oct. 29, 1999.

BACKGROUND OF THE INVENTION

The present invention relates to a method of manufacturing caliper bodies of vehicular disc brakes and to a caliper body.

A vehicular disc brake is so arranged as to obtain braking force by pressing a pair of frictional pads disposed opposite to each other with a disc rotor held therebetween to contact respective disc surfaces.

A typical vehicular disc brake is arranged so that braking force is obtained by pressing a pair of frictional pads disposed opposite to each other with a disc rotor held therebetween to contact respective disc surfaces. The caliper body of the disc brake is designed to support the frictional pads in such a way as to be press-contact the disc rotor contains a piston for pressing the disc rotor under pressure.

Generally, iron is used to make a caliper body of the sort mentioned above by casting. However, in recent years, there has developed a demand for making caliper bodies of disc brakes more lightweight and this has resulted in studying the possibilities of manufacturing caliper bodies by using lighter aluminum and aluminum alloy in place of iron. The use of aluminum or aluminum alloy for manufacturing caliper bodies can contribute to reducing their weight in comparison with the iron products.

In view of reliability, caliper bodies of disc brakes need to have sufficient rigidity. Nevertheless, in a case where aluminum or aluminum alloy is employed for making such a caliper body by casting, the strength of the product poses a problem in view of reliability. When the gravity casting method (GDC) as a relatively easy casting method is relied upon, it would be necessary to sufficiently direct attention to sink marks and the like of casts to secure sufficient rigidity. In the case of employing aluminum and aluminum alloy, temperature control is severe and unless the casting method is set in consideration of molten metal running efficiency, nonconformity such as sink marks of casts will come to be produced with a decrease in a yield rate as well as productivity. When the caliper body is made by casting, particularly by the gravity casting method, the selection of the site of providing a sprue becomes an important condition to ensure that a mold is filled up with molten metal to eliminate a sink mark in the cast.

SUMMARY OF THE INVENTION

It is an object of the present invention to provide a method of manufacturing caliper bodies of vehicular disc brakes using aluminum and aluminum alloy by casting method, particularly by the gravity casting method to ensure that the caliper body having desired rigidity and stable quality can be made to offer a highly reliable product, whereby a yield rate as well as productivity is made improvable and also provide the caliper body of a vehicular disc brake.

In order to accomplish the object above, the present invention is arranged as follows: a method of manufacturing a caliper body of a vehicular disc brake by the casting method, the caliper body being used for the vehicular disc brake wherein a pair of frictional pads are disposed opposite to each other with a disc rotor held therebetween, the caliper body having a cylinder disposed on one side of the disc rotor, a reaction pawl disposed on the other side of disc rotor, and a bridge for coupling the cylinder and the reaction pawl on the outer peripheral side of the disc rotor, is characterized in that a sprue is provided in the bottom portion of the cylinder, and that the caliper body is cast by a cavity with the side of molding the bottom portion of the cylinder disposed in the upper part of and in the vertical direction of the cavity and with the side of molding the reaction pawl disposed in the lower part of and in the vertical direction thereof. Thus, molten metal can sufficiently be run round in the cylinder and the reaction pawl, so that the caliper body of the vehicular disc brake securing sufficient rigidity is obtainable. In the method of manufacturing a caliper body of a vehicular disc brake, a gravity casting method may be used as the casting method.

The method of manufacturing the caliper body of the vehicular disc brake is characterized in that provided that the side of molding the cylinder of the cavity is made an action chamber; the side of molding the reaction pawl and the bridge is made a reaction chamber; and the site of molding a thick-walled side between the cylinder and the bridge is made a central chamber, the ratio of volume of the central chamber to that of the reaction chamber (central chamber/reaction portion) is in the range of 0.6 to 1.25, and that the ratio of volume of the central chamber to that of the action chamber (central chamber/action portion) is in the range of 0.7 to 1.35.

By setting the ratio of volume of the central chamber to that of the reaction chamber in the range of 0.6 to 1.25, solidification starts from the reaction portion where the molten metal enters first after the injection of the molten metal is carried out. The solidification of the molten metal then progresses toward the central portion where the solidification is slow. Even though the volume of the reaction portion is reduced because of the solidification, the supply of the molten metal from the central portion where the solidification is slow can be continued due to the supply effect based on the ratio of volume, whereby it is considered that any sink mark is prevented from being produced in the reaction portion. Thus, the rigidity of the reaction portion of the caliper body is sufficiently secured.

By setting the ratio of volume of the central portion to that of the action portion to 0.7-1.35 whereby while the solidification of the central portion is supplying the molten metal to the reaction portion to allow the molten metal to be continuously supplied from the action portion rather than from the central portion where the solidification is slow due to the supply effect based on the ratio of volume. Thus, any sink mark is prevented from being produced in the reaction portion and the rigidity of the central portion of the caliper body is sufficiently secured.

With respect to the action portion, moreover, as the molten metal is supplied via a gate by a feeding head, no sink mark is produced in the action portion to ensure that sufficient rigidity is secured in the action portion.

With the solidification mechanism above, by maintaining the volume ratio in the proper range and securing the continuous step by step supply effect based on the volume ratio comprising the directional solidification in the cavity and the configuration of the cast instead of heretofore relying on the supply by the feeding head from such a gate, no sink mark is produced even by the caliper body of a complicated vehicular disc brake having a great difference in the wall thickness ratio. Accordingly, a yield rate is improved and rigidity is sufficiently secured, which results in making a good-quality caliper body designed for the vehicular disc brake.

A caliper body of a vehicular disc brake to be made by the casting method, the caliper body being used for the vehicular disc brake wherein a pair of frictional pads disposed opposite to each other with a disc rotor held therebetween, the caliper body having a cylinder disposed on one side of the disc rotor, a reaction pawl disposed on the other side of disc rotor, and a bridge for coupling the cylinder and the reaction pawl on the outer peripheral side of the disc rotor, is characterized in that the caliper body is cast by a cavity with the side of molding the bottom portion of the cylinder disposed in the upper part of and in the vertical direction of the cavity and with the side of molding the reaction pawl disposed in the lower part of and in the vertical direction thereof. As molten metal is sufficiently run round in the cylinder and the reaction pawl, the caliper body of the vehicular disc brake is provided as a product that is free from a sink mark and has sufficient rigidity. The caliper body may be made by a gravity casting method.

A caliper body of a vehicular disc brake to be made by the casting method, the caliper body being used for the vehicular disc brake wherein a pair of frictional pads disposed opposite to each other with a disc rotor held therebetween, the caliper body having a cylinder disposed on one side of the disc rotor, a reaction pawl disposed on the other side of disc rotor, and a bridge for coupling the cylinder and the reaction pawl on the outer peripheral side of the disc rotor, is characterized in that a union hole in the bottom portion of the cylinder of the caliper body is used as a sprue, and the caliper body is cast by a cavity disposed with the union hole disposed in the upper part of and in the vertical direction of the cavity and with the reaction pawl disposed in the lower part of and in the vertical direction thereof. The caliper body of the vehicular disc brake is provided as a product having sufficient rigidity and as the union hole in the bottom portion of the cylinder is made the sprue, the processed sprue can directly be made the flange portion of the union hole. The caliper body may be made by a gravity casting method.

In the caliper body of the vehicular disc brake above, provided that the side of providing the cylinder is made an action chamber; the side of providing the reaction pawl and the bridge is made a reaction chamber; and the thick-walled connection between the cylinder and the bridge is made a central chamber, the caliper body is characterized in that in the state of cast metal after casting but before being subjected to a cutting process, the ratio of volume of the central chamber to that of the reaction chamber (central chamber/reaction portion) is in the range of 0.6 to 1.25, and that the ratio of volume of the central chamber to that of the action chamber (central chamber/action portion) is in the range of 0.7 to 1.35. Further, in the caliper body of the vehicular disc brake, provided that the side of providing the cylinder is made an action chamber; the side of providing the reaction pawl and the bridge is made a reaction chamber; and the thick-walled connection between the cylinder and the bridge is made a central chamber, the caliper body is characterized in that in the state of cast metal after casting and subjected to the cutting processing, the ratio of volume of the central chamber to that of the reaction chamber (central chamber/ reaction portion) is in the range of 0.6 to 1.25, and that the ratio of volume of the central chamber to that of the action chamber (central chamber/action portion) is in the range of 0.7 to 1.35.

By setting the ratio of volume of the central chamber to that of the reaction chamber (central chamber/reaction portion) in the range of 0.6 to 1.25 and setting the ratio of volume of the central chamber to that of the action chamber (central chamber/action portion) in the range of 0.7 to 1.35, it is possible to secure the continuous step by step supply effect based on the volume ratio comprising the directional solidification in the cavity and the configuration of the cast instead of heretofore relying on the supply by the feeding head, no sink mark is produced even by the caliper body of a complicated vehicular disc brake having a great difference in the wall thickness ratio. Accordingly, a yield rate is improved and rigidity is sufficiently secured, which results in making a good-quality caliper body designed for the vehicular disc brake.

In the caliper body of the vehicular disc brake above, casting can be carried out by inserting the front end portion of a core into the cylinder hole and in this case, the molten metal injected from the bottom portion side of the cylinder is introduced from the front end side of the core along the bridge and the reaction pawl side with the effect of improving the running efficiency of the molten metal and further providing a caliper body having excellent rigidity.

In the caliper body of the vehicular disc brake above, moreover, a product using aluminum or aluminum alloy as a base material is utilizable effectively as what is light and provided with sufficient rigidity.

DETAILED DESCRIPTION OF THE PREFERRED EMBODIMENTS

The preferred embodiment of the invention will now be described in detail with reference to the accompanying drawings.

Figure 1:
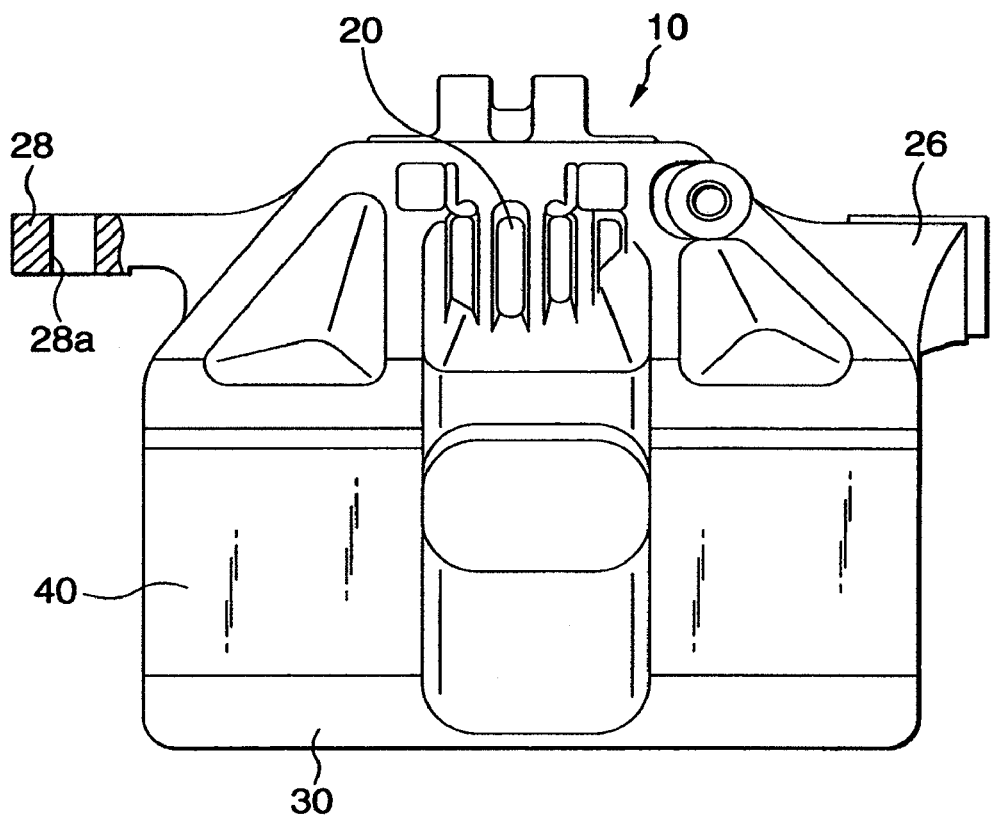
FIG. 1 shows a plan view of a caliper body of a vehicular disc brake embodying the invention.
Figure 2:
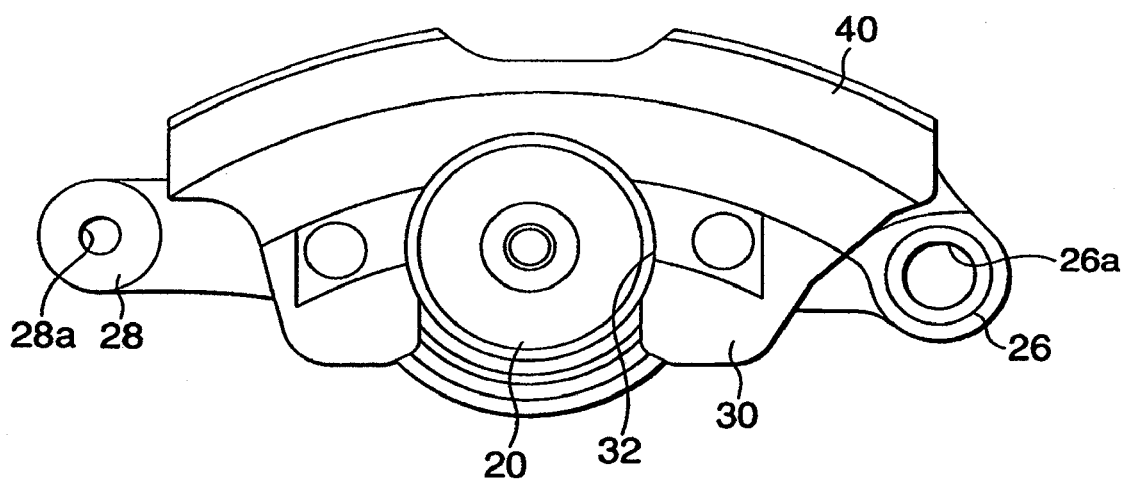
FIG. 2 shows an front view of the caliper body of the vehicular disc brake embodying the invention.
Figure 3:
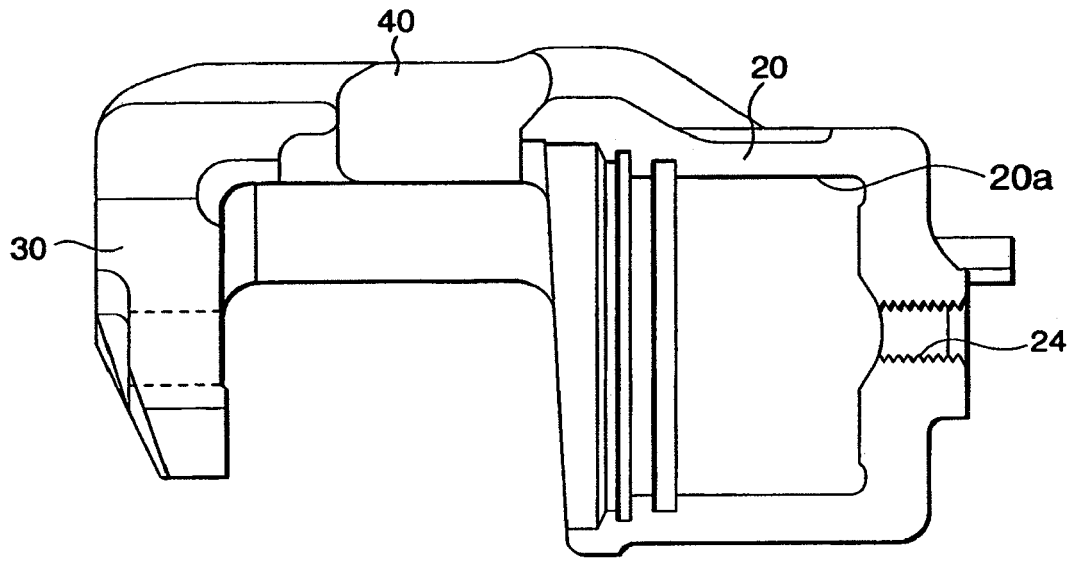
FIG. 3 shows a sectional side view of the caliper body of the vehicular disc brake embodying the invention.

FIGS. 1, 2 and 3 are respectively a plan view, an elevational view and a sectional side view showing the construction of the caliper body of a vehicular disc brake embodying the present invention. The caliper body 10 is made by the gravity casting method using aluminum. FIGS. 1-3 show the casting that has been cast and then subjected to a cutting process.

The caliper body 10 substantially comprises a cylinder 20 for containing a piston, a reaction pawl 30 disposed opposite to the cylinder 20, and a bridge 40 for coupling the cylinder 20 and the reaction pawl 30.

A cylindrical cylinder hole 20a for containing the piston is formed in the cylinder 20. The reaction pawl 30 is a part for making the pressing force of the piston as a counter force act on frictional pads and formed in such a way that it is bent in a direction substantially perpendicular to the bridge 40 as shown in FIG. 3. A U-shaped cutout 32 in elevational view is formed in the central portion of the reaction pawl 30, so that the pawl portion is extended laterally from the bridge 40 as shown in FIG. 2.

As shown in FIG. 3, the bridge 40 is a part for coupling and connecting the cylinder 20 and the reaction pawl 30 and is as shown in FIG. 2 formed so as to curve in an arcuate form harmoniously with the outer peripheral diameter of a disc rotor. As shown in FIG. 1, the bridge 40 is formed into a planar and substantially rectangular shape. FIG. 1 shows that as a whole the caliper body 10 is formed into a substantially lateral symmetric shape with the cylinder 20 set in the substantially central position and is also formed so that its width may gradually be increased from the cylinder 20 up to the bridge 40. Reference numerals 26 and 28 denote arm portions formed with insertion holes 26a and 28a into which bolts for supporting brackets are inserted.

Figure 4:
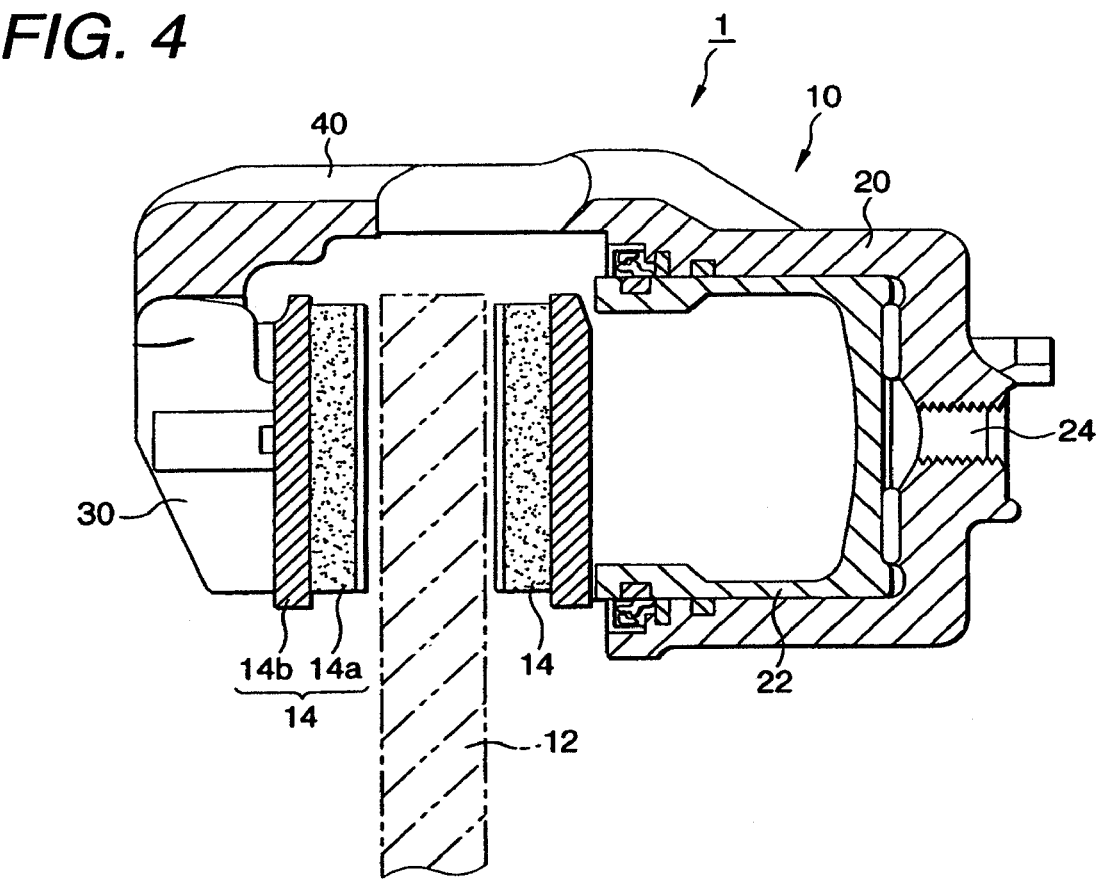
FIG. 4 shows a diagram explanatory of an arrangement of pressing frictional pads to contact a disc rotor.

FIG. 4 is a diagram explanatory of a state in which the caliper body 10 according to this embodiment of the invention is used to form a disc brake 1. Reference numeral 12 denotes a disc rotor, and frictional pads 14 and 14 are disposed opposite in position to each other as to hold the disc rotor 12 therebetween. Reference numeral 14a denotes a frictional material; and 14b, a back plate. The frictional pads 14 are supported by the caliper body 10 so that they can be pressed to contact the respective rotor surfaces of the disc rotor 12 via a bracket (not shown). Reference numeral 22 denotes a piston mounted in the cylinder 20; and 24, a union hole opened in the center of the bottom portion of the cylinder 20.

A hydraulic circuit for braking communicates with the union hole 24 through which brake fluid is introduced into the cylinder hole 20a. The cylinder 20 is disposed on side of the disc rotor 12, whereas the reaction pawl 30 is disposed on the other side of the disc rotor 12 facing the cylinder 20. Consequently, the generation of fluid pressure from a fluid generating means such as a master cylinder (not shown) causes the fluid pressure to be introduced into the cylinder hole 20a. When the piston that has been moved forward presses the frictional pad 14 to contact the disc rotor 12, the pressing force of the piston 22 acts on the frictional pad 14 on the other side as counter force via the bridge 40 and the reaction pawl 30, thus pressing the frictional pad 14 on the other side to contact the disc rotor 12. Thus, the disc rotor 12 is clamped under pressure between both frictional pads 14 and 14 and this results in producing braking force.

As mentioned above, the caliper body 10 according to this embodiment of the invention is made by the gravity casting method using aluminum. As molten metal is not press-fitted into a mold under high pressure by the gravity casting method, it is necessary to determine a sprue and the configuration of each part in consideration of how the molten metal runs round in the mold in a case where what has a complicated configuration is produced.

Figure 5:
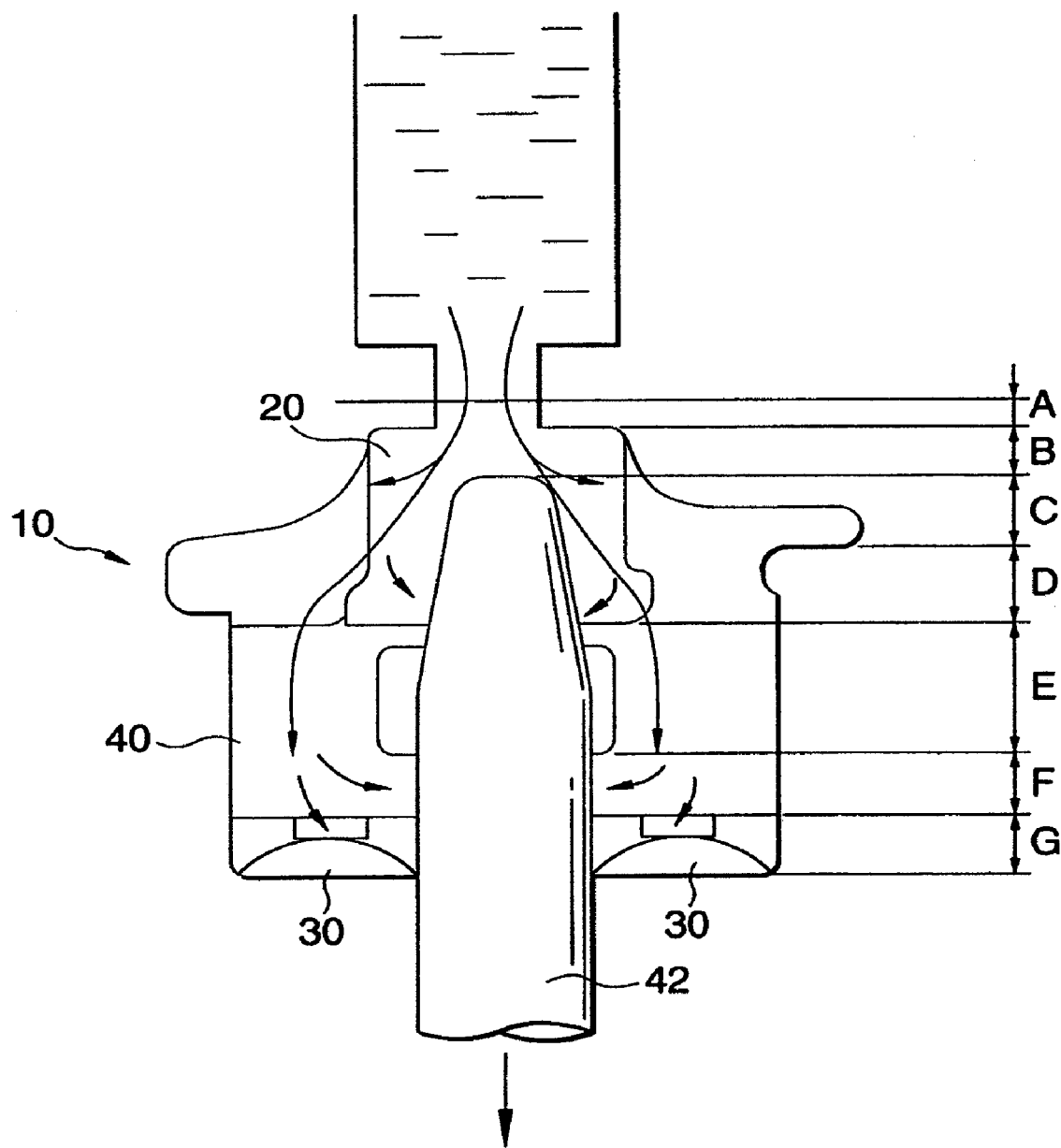
FIG. 5 shows a diagram explanatory of a method of making the caliper body of the vehicular disc brake.

FIG. 5 is a diagram explanatory of a process of making the caliper body 10 according to this embodiment of the invention by the gravity casting method using aluminum. This embodiment of the invention is characterized in that the cavity of a mold for use in molding the caliper body 10 is arranged so that the side of molding the bottom portion of the cylinder 20, that is, the union hole 24 is positioned in the vertically upper part of the cavity; the side of molding the reaction pawl 30 is in the lower part thereof; and the sprue is disposed in the union hole 24 as the bottom portion of the cylinder 20 whereby to inject the molten metal into the cavity. Reference numeral 42 denotes a core. The cylinder 20 is disposed in the substantially center of the bilateral direction and cylindrical with a hollow interior. The one side of the bridge 40 is opened and formed with the cutout on the side of the reaction pawl 30 to cover up these parts, and the core 42 is formed into such a shape that these parts can be drawn downward.

As shown in FIG. 5, the cylinder 20 of the caliper body 10 is set to look upward and according to the casting method in which the molten metal is injected from the site where the union hole 24 is formed, the molten metal is laterally and uniformly injected into the mold because the site through which the molten metal is injected is in bilateral symmetry with respect to the sprue, so that the molten metal is uniformly injected as a whole. Since the molten metal is thus uniformly injected into the mold, the molten metal is allowed to run sufficiently up to the site where the lower-side reaction pawl 30, to say nothing of the cylinder 20, is molded, whereby it is possible to obtain the caliper body 10 that is stable in quality without a sink mark and has sufficient rigidity.

With attention riveted to the sprue portion, the formation of the sprue in the central portion of the edge face of the cylinder 20 is advantageous in that the flange portion of the union hole 24 is simply formable only by processing the sprue portion after the casting.

The use of the core 42 causes the molten metal injected from the sprue to run toward the disc running-in and running-out sides of the bridge 40 along the core 42 to ensure that the molten metal runs round toward the reaction pawls 30 laterally positioned, which makes the running efficiency of the molten metal improvable.

Figure 6:
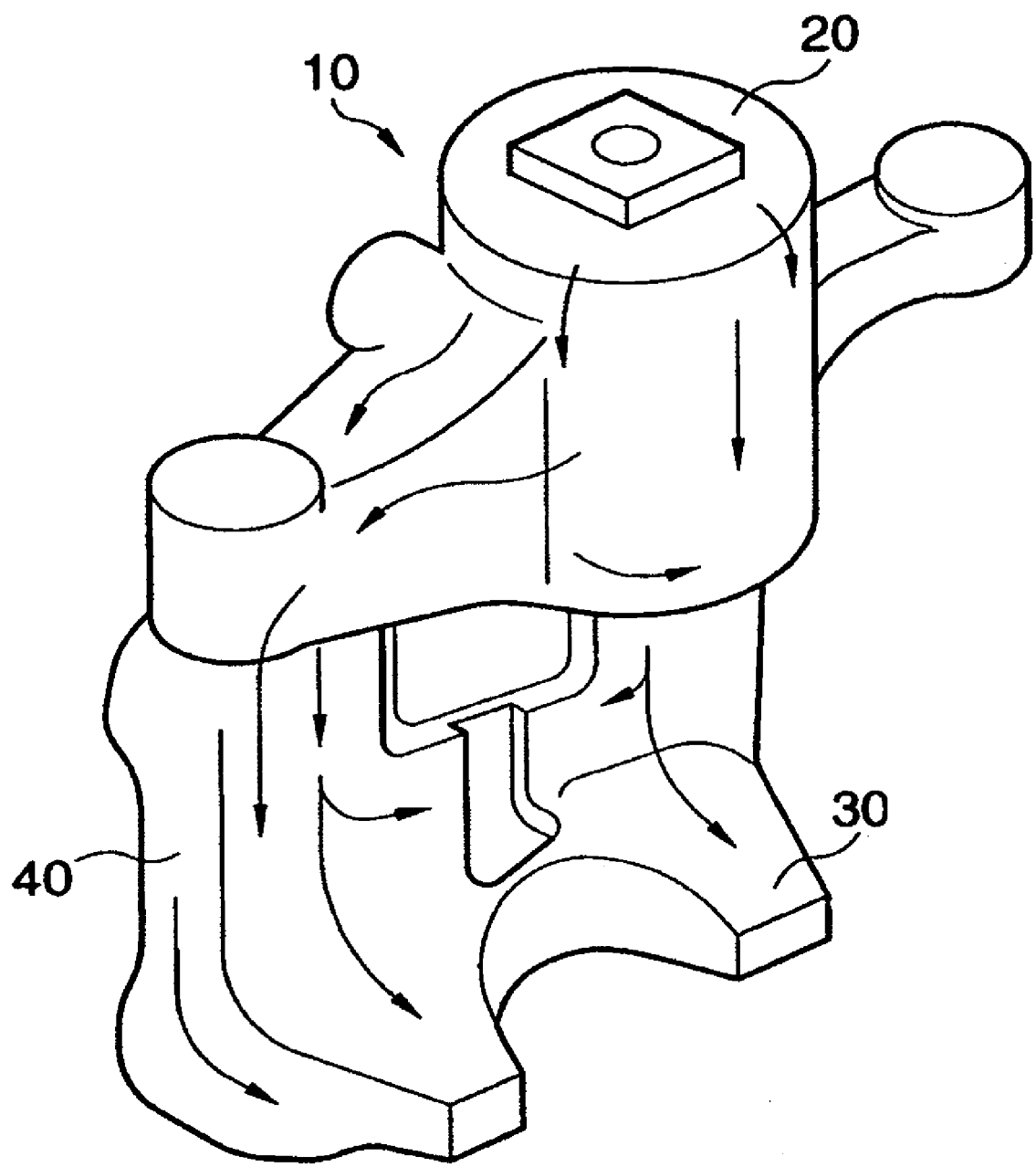
FIG. 6 shows a diagram explanatory of the behavior of molten metal running round from a cylinder toward the side of a reaction pawl.

FIG. 6 is a perspective view of the situation in which the molten metal runs round from the cylinder 20 to the side of the reaction pawl 30 in the case of the casting method shown in FIG. 5.

Thus, in the caliper body manufacturing method according to this embodiment of the invention, the manufacture of a cast of good quality by letting the molten metal run round effectively in the whole mold. When the caliper body is actually designed, however, as the molten metal is caused to run round suitably in the mold to make a product having desired rigidity, the volume of each portion of the caliper body needs to be determined properly. This is because the weight of molten metal to be injected into the mold affects the casting result when the gravity casting method is employed for casting purposes.

Figure 7:
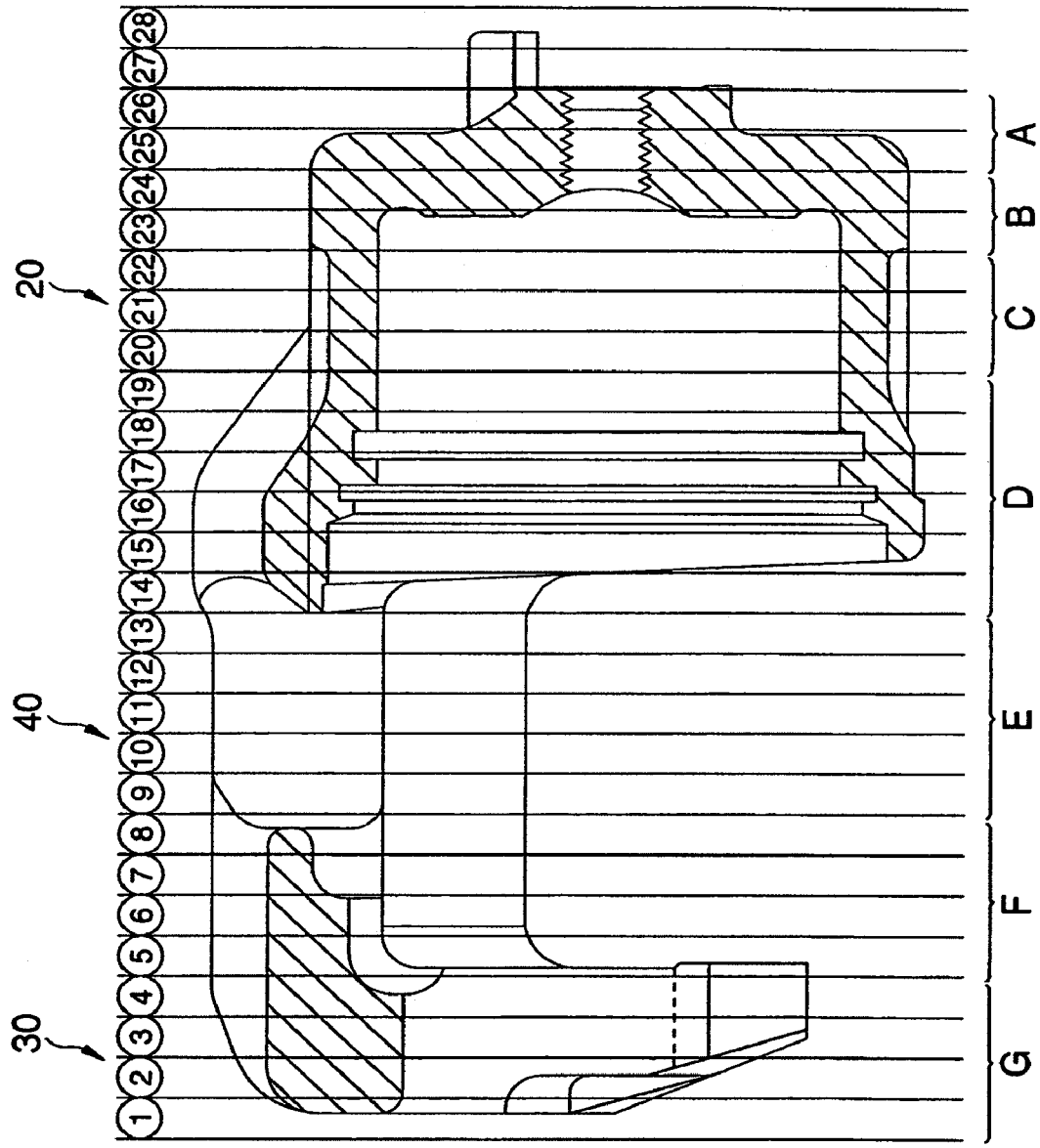
FIG. 7 shows a diagram explanatory of a state in which the caliper body is divided into sections in order to measure the volume of each.

FIG. 7 is a diagram showing the caliper body 10 according to this embodiment of the invention which is actually sectioned at equal intervals from the cylinder 20 toward the reaction pawl 30 in order to measure the volume of each section. The meaning of dividing the caliper body 10 into sections from the cylinder 20 toward the reaction pawl 30 as shown in FIG. 7 is that by dividing the caliper body 10 in a direction perpendicular to the direction in which the molten metal is injected into the mold, the volume of the molten metal to be injected into the mold is taken into consideration.

Figure 8:
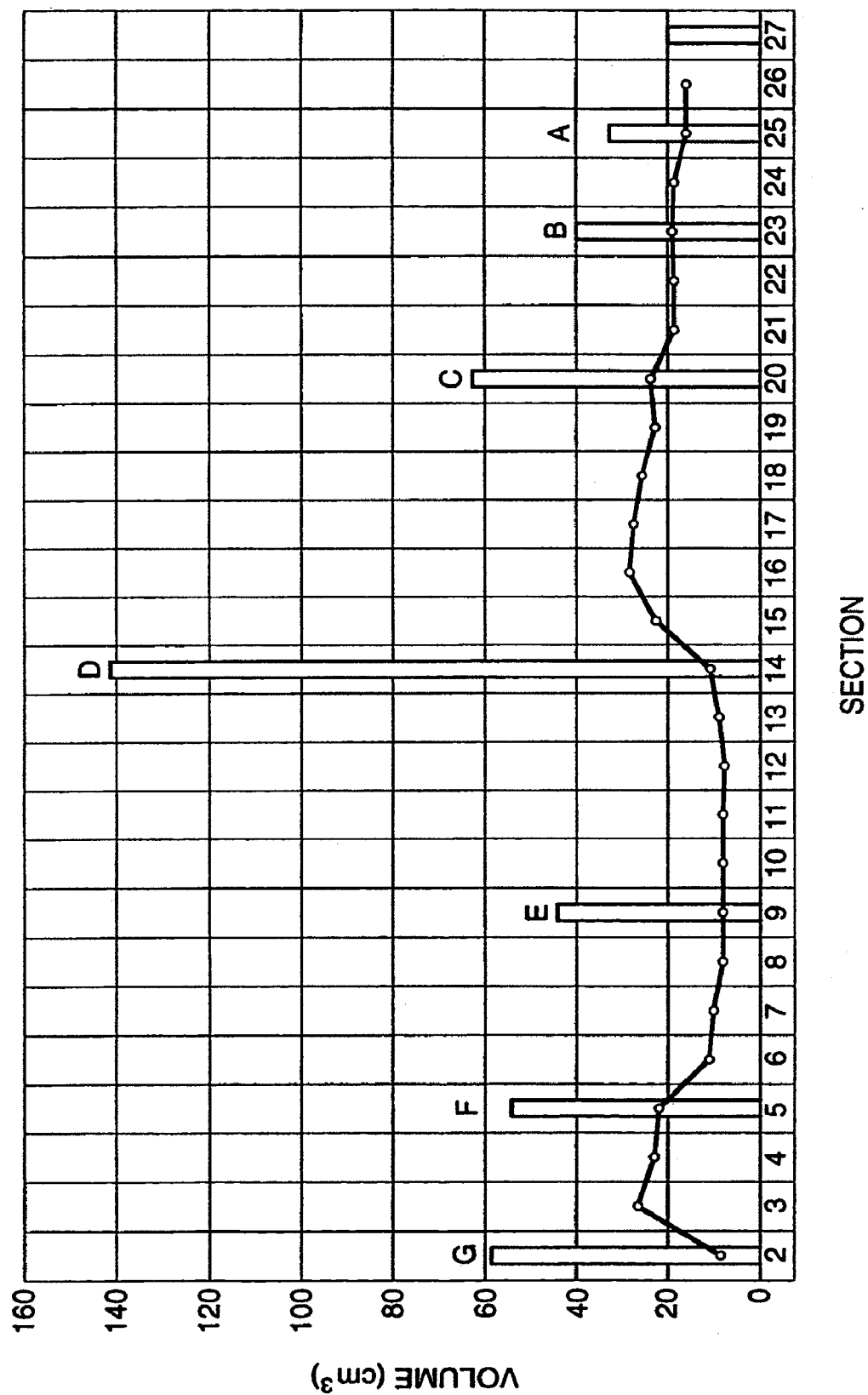
FIG. 8 shows a graph showing the measured results of each section of the caliper body after casting and before being subjected to a cutting process.
Figure 9:
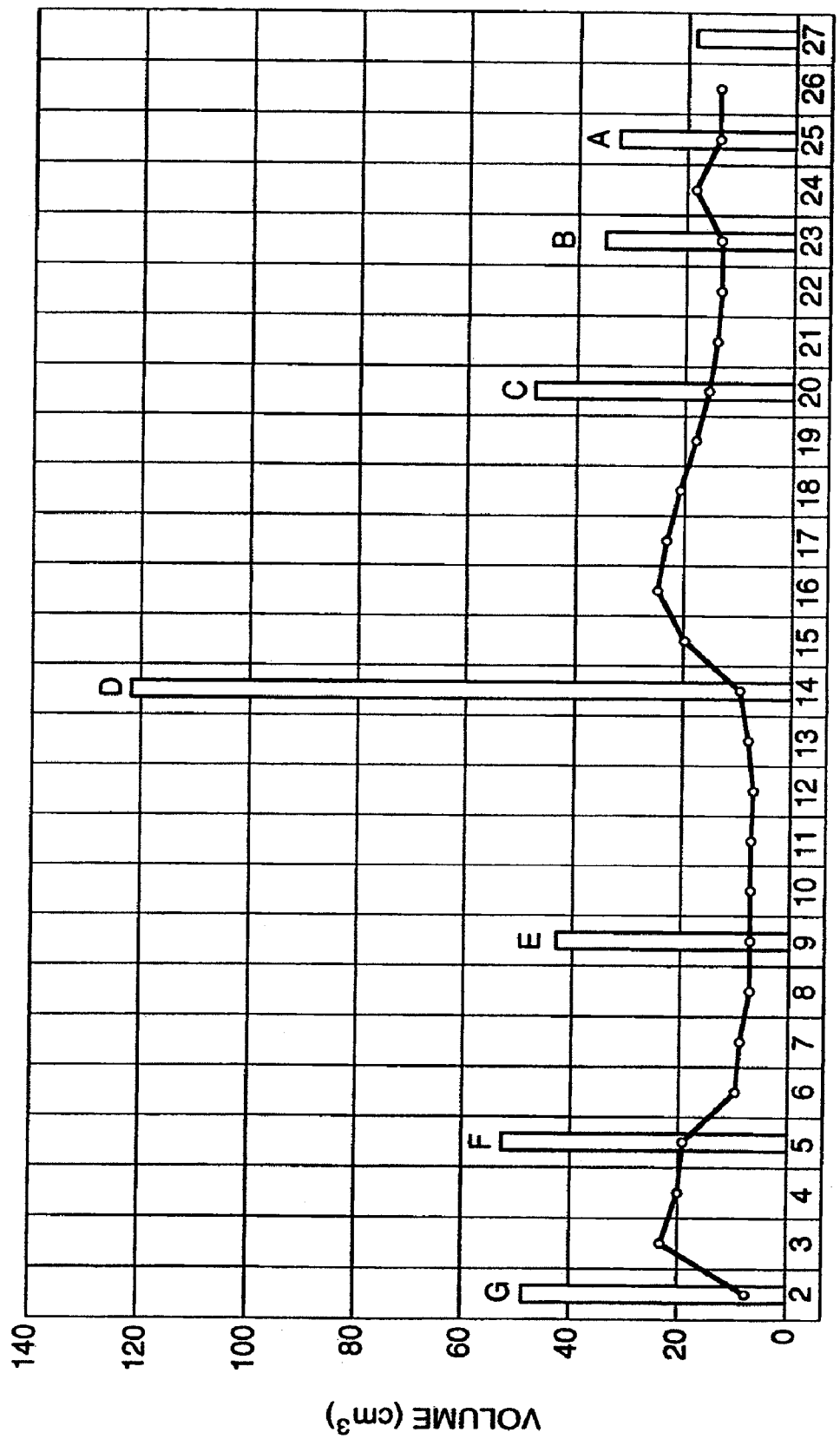
FIG. 9 shows a graph showing the measured results of each section of the caliper body after casting and being subjected to the cutting process.

FIGS. 8 and 9 are graphs indicating the volume of each section when the caliper body 10 is divided equally into 28 sections as shown in FIG. 7. FIG. 8 refers to a state in which the caliper body 10 is taken out of the mold before being subjected to the cutting process; and FIG. 9, a state in which it has been subjected to the cutting process.

In the graphs of FIGS. 8 and 9, the abscissa axis shows the position of each section when the caliper body 10 has been divided equally into sections and the ordinate axis shows the volume of each section. The pillar-like graphs in FIGS. 8 and 9 show the volume in each group (the added-up volume of the sections in the relevant group) when the sections resulting from equally dividing the caliper body 10 are further divided into seven groups A-G.

Tables 1 and 2 show the volume of each section and the volume in each group. Table 1 refers to the volume in each group before the cutting process is performed and Table 2 refers to data after the cutting process is performed.

TABLE 1

| | Sections | | | | | | | | |
|---|---|---|---|---|---|---|---|---|---|
| | 2 | 3 | 4 | 5 | 6 | 7 | 8 | 9 | 10 |
| Volume of the whole section (cm³) | 58.3 | | | 54.5 | | | 44.1 | | |
| Volume of section (cm³) | 9 | 27 | 22.3 | 22.3 | 11.1 | 10.8 | 10.3 | 9 | 8.6 |

| | Sections | | | | | | | | |
|---|---|---|---|---|---|---|---|---|---|
| | 11 | 12 | 13 | 14 | 15 | 16 | 17 | 18 | 19 |
| Volume of the whole section (cm³) | | | | | 141.6 | | | | |
| Volume of section (cm³) | 8.5 | 8.5 | 9.5 | 11.5 | 23.3 | 29.3 | 28.4 | 26 | 23.1 |

| | Sections | | | | | | | |
|---|---|---|---|---|---|---|---|---|
| | 20 | 21 | 22 | 23 | 24 | 25 | 26 | 27 |
| Volume of the whole section (cm³) | 63 | | | 39.7 | | | 34 | 20.5 |
| Volume of section (cm³) | 24.1 | 19.6 | 19.3 | 19.7 | 20 | 17 | 17 | |

TABLE 2

| | Sections | | | | | | | | |
|---|---|---|---|---|---|---|---|---|---|
| | 2 | 3 | 4 | 5 | 6 | 7 | 8 | 9 | 10 |
| Volume of the whole section (cm³) | 51.1 | | | 54.5 | | | 44.1 | | |
| Volume of section (cm³) | 7.2 | 21.6 | 22.3 | 22.3 | 11.1 | 10.8 | 10.3 | 9 | 8.6 |

| | Sections | | | | | | | | |
|---|---|---|---|---|---|---|---|---|---|
| | 11 | 12 | 13 | 14 | 15 | 16 | 17 | 18 | 19 |
| Volume of the whole section (cm³) | | | | | 123.6 | | | | |
| Volume of section (cm³) | 8.5 | 8.5 | 9.5 | 11.5 | 19.7 | 25.7 | 24.8 | 22.4 | 19.5 |

| | Sections | | | | | | | |
|---|---|---|---|---|---|---|---|---|
| | 20 | 21 | 22 | 23 | 24 | 25 | 26 | 27 |
| Volume of the whole section (cm³) | 48.9 | | | 36.1 | | | 34 | 20.5 |
| Volume of section (cm³) | 17.2 | 16 | 15.7 | 16.1 | 20 | 17 | 17 | |

The division of the caliper body 10 into sections reveals that the volume of the section in the central portion of the caliper body 10 formed relatively thickly becomes greater. As the molten metal is injected from the top of the cavity as shown in FIG. 5 when the molten metal is injected into the mold, the reason for the division of the caliper body 10 into the seven groups A-G is that it is meaningful to divide the caliper body 10 into sections in view of coherence of configuration when the running efficiency of the molten metal is taken into consideration.

A, B and C groups correspond to the cylinder 20 of the caliper body 10 and equivalent to the upper position where the molten metal is injected in. As viewed from the direction of injecting the molten metal, D group is in the substantially central position of the mold and as shown in FIGS. 8 and 9 the distribution of the volume is greatest. E, F and G groups are site having a relatively small volume and like the reaction pawl 30 where the direction of injecting the molten metal is bent, the sites develop a problem arising from the running of the molten metal.

When the profile of the caliper body 10, the distribution of volume of the sections A-G and the running of the molten metal in each section are taken into consideration, the quality of the cast is considered to be affected by the volume of each section in the case where the caliper body 10 is cast by the gravity casting method. Accordingly, the caliper body 10 was divided into three areas: A, B and C sections (the site of the cylinder 20); D section where the ratio of volume was greatest; and E, F and G sections (the site including the reaction pawl 30 and the bridge 40) of FIG. 7, products were examined to see whether they were good or bad with the ratios of volume as indexes.

Hereinafter, A, B and C sections are referred to as action portions acting on the frictional pads, and E, F and G sections are referred to as reaction portions. The central portion is the thick-walled connecting portion D formed between the cylinder 20 and the bridge 40. Moreover, the sites where the action portion, the reaction portion and the central portion are molded in the cavity of the mold are called an action chamber, an reaction chamber and a central chamber, respectively.

Figure 10:
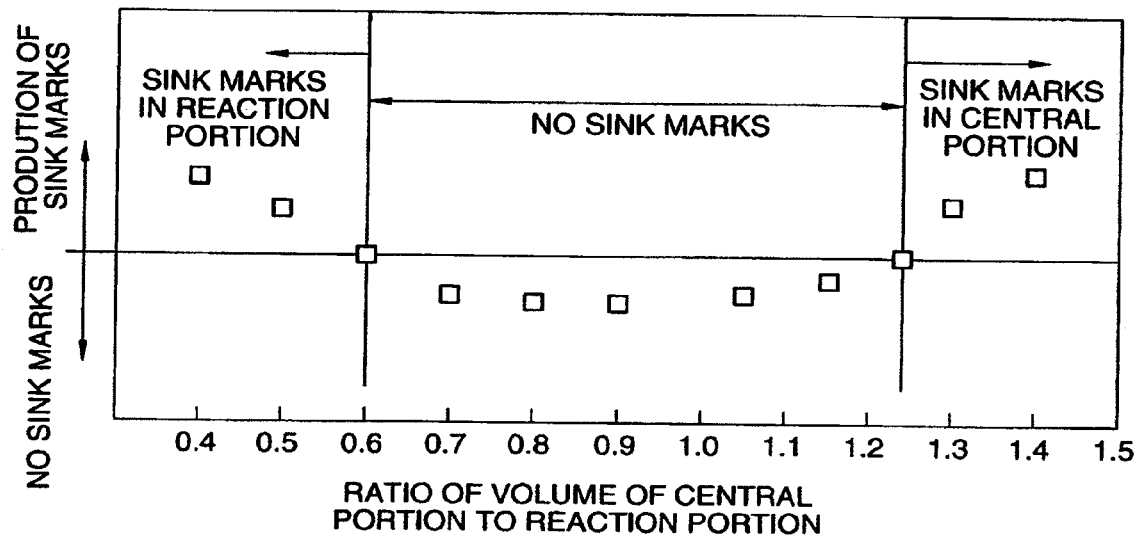
FIG. 10 shows a graph showing test results of the production of sink marks on casts of caliper bodies with the values in the central chamber/reaction chamber as indexes.

FIG. 10 shows the results examined on the sink marks of cast products with the ratio of volume of the central portion to that of the action portion as an index. The values on the abscissa axis represent those which have resulted from dividing the volume of the central portion by that of the reaction portion.

According to the test results, no sink marks appear on the cast products when the values of (central portion/reaction portion) are in the range of 0.6 to 1.25, so that good products are obtainable. When the values of (central portion/reaction portion) are less than 0.6, the sink marks are seen to appear in the reaction portion and when the values of (central portion/reaction portion) are greater than 1.25, the sink marks appear in the central portion. Regarding the product before the cutting process shown in FIG. 8, the value of (central portion/reaction portion) is 0.9 and regarding the product after the cutting process shown in FIG. 9, the value of (central portion/reaction portion) is 0.82.

The relation of the ratio of volume of the central portion to that of the reaction portion, that is, while the ratio of volume of the central portion thereto is in the range of 0.6 to 1.25, solidification starts from the reaction portion (reaction chamber) where the molten metal enters first after the injection of the molten metal is carried out. The solidification of the molten metal then progresses toward the central portion where the solidification is slow. Even though the volume of the reaction portion is reduced because of the solidification, the supply of the molten metal from the central portion where the solidification is slow can be continued due to the supply effect based on the ratio of volume, whereby it is considered that any sink mark is prevented from being produced in the reaction portion. Thus, the rigidity of the reaction portion of the caliper body is sufficiently secured.

Figure 11:
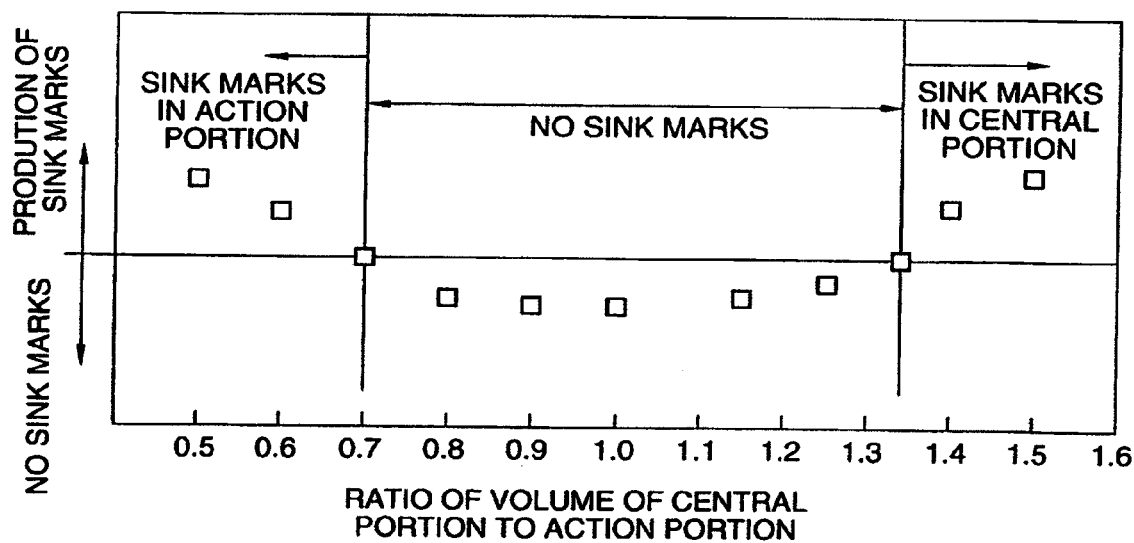
FIG. 11 shows a graph showing test results of the production of sink marks on casts of caliper bodies with the values in the central chamber/action chamber as indexes.

FIG. 11 shows the results examined on the sink marks of cast products with the ratio of volume of the central portion to that of the action portion as an index. The values on the abscissa axis represent those which have resulted from dividing the volume of the central portion by that of the action portion.

According to the test results, no sink marks appear on the cast products when the values of (central portion/action portion) are in the range of 0.7 to 1.35, so that good products are obtainable. When the values of (central portion/action portion) are less than 0.7, the sink marks are seen to appear in the action portion and when the values of (central portion/action portion) are greater than 1.35, the sink marks appear in the central portion. Regarding the product before the cutting process shown in FIG. 8, the value of (central portion/action portion) is 1.04 and regarding the product after the cutting process shown in FIG. 9, the value of (central portion/action portion) is 1.03.

The relation between the central portion and the action portion, that is, the ratio of volume of the central portion to that of the action portion is set to 0.7-1.35 whereby while the solidification of the central portion is supplying the molten metal to the reaction portion to allow the molten metal to be continuously supplied from the action portion rather than from the central portion where the solidification is slow due to the supply effect based on the ratio of volume. Thus, it is considered that any sink mark is prevented from being produced in the reaction portion and the rigidity of the central portion of the caliper body is sufficiently secured.

With respect to the action portion, moreover, as the molten metal is supplied via a gate by a feeding head, no sink mark is produced in the action portion to ensure that sufficient rigidity is secured in the action portion.

In the case of manufacturing the caliper bodies of vehicular disc brakes particularly by the gravity casting method, as casting is not carried out by applying pressure to molten metal, the running efficiency and solidifying properties in the cavity of the mold are brought into question to make a good cast free from the sink mark. When a product having a complicated configuration and a great difference in the wall thickness ratio is cast, the supply of the molten metal by the effect of the feeding head and the setting of the volume ratio among the reaction, central and action portions properly make it possible to provide the caliper body of a vehicular disc brake which does not produce a sink mark in each portion, offers a high yield rate and secures sufficient rigidity.

In the method of manufacturing the caliper body of the vehicular disc brake and the caliper body according to the invention, the caliper body can surely be made as a product securing sufficient rigidity and as a good product having desired rigidity. In particular, by properly selecting the ratio of volume of the central portion to that of the reaction portion and the ratio of volume of the central portion to that of the action portion, it is possible to provide a product having desired rigidity for certain without the problem of sink marks and the like. Moreover, the use of aluminum or aluminum alloy as a base material makes the caliper body lighter than before and the invention has the magnificent effect of providing the useful caliper body of a vehicular disc brake having desired rigidity.

While there has been described in connection with the preferred embodiment of the invention, it will be obvious to those skilled in the art that various changes and modifications may be made therein without departing from the invention, and it is aimed, therefore, to cover in the appended claim all such changes and modifications as fall within the true spirit and scope of the invention.

What is claimed is:

1. A casting method for manufacturing a caliper body of a vehicular disc brake, said vehicular disc brake having a pair of frictional pads disposed opposite to each other with a disc rotor held therebetween, said caliper body including a cylinder disposed on one side of the disc rotor, a reaction pawl disposed on the other side of the disc rotor, and a bridge for coupling said cylinder and said reaction pawl at the outer peripheral side of the disc rotor, said casting method comprising:

forming a cavity corresponding to a shape of said caliper body while the side of molding said bottom portion of said cylinder is disposed in a vertically upper part of said cavity and also the side of molding said reaction pawl is disposed in a vertically lower part of said cavity; and molding a base material into said cavity through a sprue which is disposed at a portion molding said bottom portion of said cylinder.

2. The casting method for manufacturing the caliper body as claimed in claim 1, wherein said casting method comprises a gravity casting method.

3. The casting method for manufacturing the caliper body as claimed in claim 1, wherein the side of molding said cylinder of said cavity is made an action chamber; the side of molding said reaction pawl and said bridge is made a reaction chamber; and the site of molding a thick-walled side between said cylinder and said bridge is made a central chamber, and wherein the ratio of volume of the central chamber to that of the reaction chamber is set in the range of 0.6 to 1.25, and the ratio of volume of the central chamber to that of the action chamber is set in the range of 0.7 to 1.35.

4. The casting method for manufacturing the caliper body as claimed in claim 1, wherein said base material is aluminum or aluminum alloy.

5. The casting method for manufacturing the caliper body as claimed in claim 3, wherein said base material is aluminum or aluminum alloy.

6. The casting method for manufacturing the caliper body as claimed in claim 1, said caliper body being used for the vehicular disc brake, said caliper body comprising the pair of frictional pads disposed opposite to each other with the disc rotor held therebetween, further comprising:

casting the caliper body with the cavity with the side of molding the bottom portion of said cylinder disposed in the upper part of and in the vertical direction of said cavity and with the side of molding said reaction pawl disposed in the lower part of and in the vertical direction thereof; and forming a sprue at the bottom portion, wherein a one side of providing said cylinder is made an action chamber;

an other side of molding said reaction pawl and said bridge is made a reaction chamber; and a thick-walled connection between said cylinder and said bridge is made a central chamber.

7. The casting method for manufacturing the caliper body as claimed in claim 6, wherein the sprue is formed from the base material.

8. The casting method for manufacturing the caliper body as claimed in claim 7, wherein said base material is aluminum or aluminum alloy.

9. The casting method for manufacturing the caliper body as claimed in claim 6, wherein said casting method comprises a gravity casting method.

10. A casting method for manufacturing a caliper body of a vehicular disc brake, said caliper body having a pair of frictional pads disposed opposite to each other with a disc rotor held therebetween, said caliper body including a cylinder disposed on one side of the disc rotor, a reaction pawl disposed on the other side of the disc rotor, and a bridge for coupling said cylinder and said reaction pawl at the outer peripheral side of the disc rotor, said casting method comprising:

casting the caliper body by forming a cavity with a side of molding the bottom portion of said cylinder disposed in the upper part of and in the vertical direction of said cavity and with the side of molding said reaction pawl disposed in the lower part of and in the vertical direction thereof;

forming a sprue at the bottom portion with a base material, wherein a one side of providing said cylinder is made an action chamber;

an other side of molding said reaction pawl and said bridge is made a reaction chamber; and a thick-walled connection between said cylinder and said bridge is made a central chamber.

11. The casting method for manufacturing the caliper body as claimed in claim 10, wherein said casting method comprises a gravity casting method.

12. The casting method for manufacturing the caliper body as claimed in claim 11, wherein the ratio of volume of the central chamber to that of the reaction chamber is set in the range of 0.6 to 1.25, and the ratio of volume of the central chamber to that of the action chamber is set in the range of 0.7 to 1.35.

13. The casting method for manufacturing the caliper body as claimed in claim 11, wherein said base material is aluminum or aluminum alloy.

* * * * *